United States Patent
Hoffman et al.

[11] Patent Number: 6,033,164
[45] Date of Patent: Mar. 7, 2000

[54] PORTABLE KEY CUTER ASSEMBLY

[76] Inventors: Jerome L. Hoffman, 1491 Sanders Rd., Riverwoods, Ill. 60015; Levon Peden, 8451 S. Winchester Ave., Chicago, Ill. 60620

[21] Appl. No.: 09/138,653

[22] Filed: Aug. 24, 1998

[51] Int. Cl.$^7$ .................................................. B23C 3/35
[52] U.S. Cl. ............................................. 409/81; 409/83
[58] Field of Search ...................... 409/81, 83; 76/110

[56] References Cited

U.S. PATENT DOCUMENTS

| | | | |
|---|---|---|---|
| 1,089,127 | 3/1914 | Gussman | 409/81 |
| 1,165,099 | 12/1915 | Hoernel | 409/81 |
| 1,848,046 | 3/1932 | Caron | 409/81 |
| 2,167,008 | 7/1939 | Shepse | 409/81 |

Primary Examiner—Daniel W. Howell

[57] ABSTRACT

This invention relates to a portable key cutter assembly. It consists of a cutter housing assembly including a drive shaft for receiving a portable power source. A carriage assembly is provided that is separate from and freely movable relative to the cutter housing assembly. The carriage includes spaced clamping assemblies that support a key and a key blank to be cut into a duplicate of the key when the key is engaged by a tracer point and the key blank is simultaneously engaged by the cutter.

9 Claims, 2 Drawing Sheets

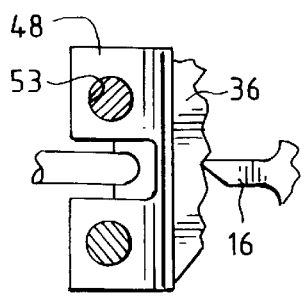
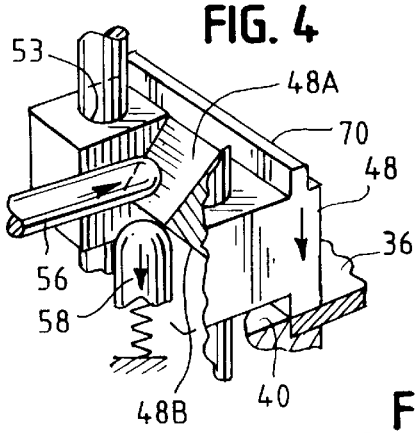
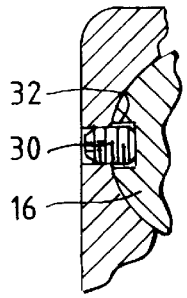
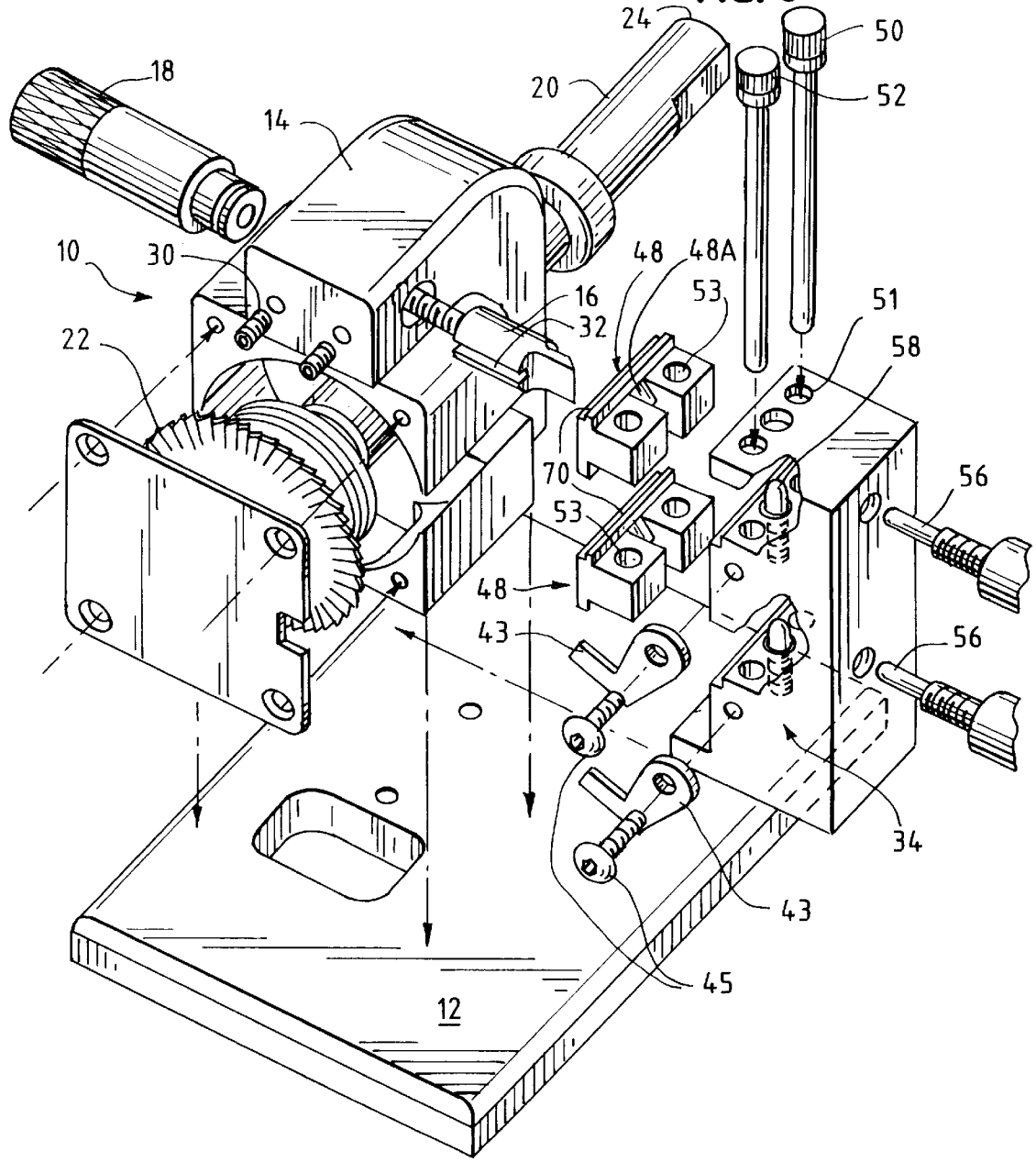

PORTABLE KEY CUTER ASSEMBLY

BACKGROUND OF INVENTION

The cutting of keys normally requires a substantial piece of equipment with the result that keys cannot readily be duplicated on the spot. This results from the need for a power source to drive the cutting mechanism. It can readily be appreciated that there has long been a need for an accurate, affordable and portable key duplicating machine that is light in weight and can be easily transported to a place where a key is to be duplicated. To this end the cutting mechanism must be designed to use a readily available power source such as a portable electric motor with a fitting to receive and drive a cutter shaft. The key cutting device should be compact enough to fit into a toolbox. In essence, it has long been the wish of those in the key making business to be able to bring the duplicator to the key, and not to bring the key to the duplicator.

SUMMARY OF THE INVENTION

In accordance with the present invention there is provided a compact, portable, accurate key duplicator which is light in weight and can be placed in a toolbox for easy transport The key cutter assembly is designed to use as a power source a portable electric motor such as an electric drill which includes a chuck mechanism to receive the cutter shaft to drive the cutter blade to accomplish the duplicating function. Thus the requirement of a power supply can be readily met. The need for the large somewhat bulky key cutting mechanism with a self-contained power source is overcome and the highly desirable result of being able to duplicate a key on the spot and instantly is readily available and solves a problem that has long plagued the industry.

It is of course necessary that the key being duplicated and the key blank be positively locked in place to insure accuracy and to this end there is provided a novel clamping mechanism that readily can be adjusted to handle a variety of keys and can accurately and positively lock the key and key blank in position.

In the present invention the portable key cutting mechanism consists of a support plate to which is secured a cutter housing assembly in which the cutter blade is located. This cutter blade is driven by a cutter shaft that extends outwardly of the housing and is adapted to be connected to the chuck of a power drill or other suitable power source.

In addition, the cutter housing has located in the upper portion thereof a longitudinally adjustable tracer point that is used to conform the cutting action of the key blank to the key being duplicated. The key and the key blank to duplicate the key is clamped in vertically spaced relationship into a carriage assembly that is separate from and slidably movable on the support plate during the cutting action. During setup the key and key blank are clamped in position and are located in their proper relative position by key gauges. The carriage is then moved into position relative to the tracer point and cutter so that when the key cutting action is to occur the carriage is merely moved on the platform in the well known manner by having the tracer point following the pattern of the key being duplicated. During this action the cutting blade located below the tracer point will be doing the requisite cutting action. If it is desired, the support can be secured to a counter top or bench. The upper surface of the support is smooth to enable accurate movement of the carriage assembly relative to the support platform.

The clamping mechanism consists of clamping jaws that are positioned within the appropriately located recesses in the carriage assembly so that when the key blank and key are clamped into position in said recesses and moved into position they are located immediately adjacent the cutter and the tracer point respectively. When the key and key blank are properly located with respect to the carriage by key gauges, the clamping means are tightened by adjusting knobs acting on downwardly sloped wedge shaped surfaces on the back of the jaws to bias them into clamping engagement with the key and key blank. The jaws are retained in position relative to the carriage by longitudinally extending studs. When the adjusting knobs are retracted the jaws are returned to a released position by spring pressed plungers abutting the underside of the wedge to move the jaws upward and thus permit the keys to be removed.

BRIEF DESCRIPTION OF THE DRAWING

FIG. 3 is a view taken along line 3—3 of FIG. 2;

FIG. 4 is a perspective view of the clamping system;

FIG. 5 is a view taken along line 5—5 of FIG. 2; and

FIG. 6 is an exploded perspective view of the carriage and cutting housing assembly spaced from the base support.

DESCRIPTION OF THE PREFFERED EMBODIMENT

Figure 1:
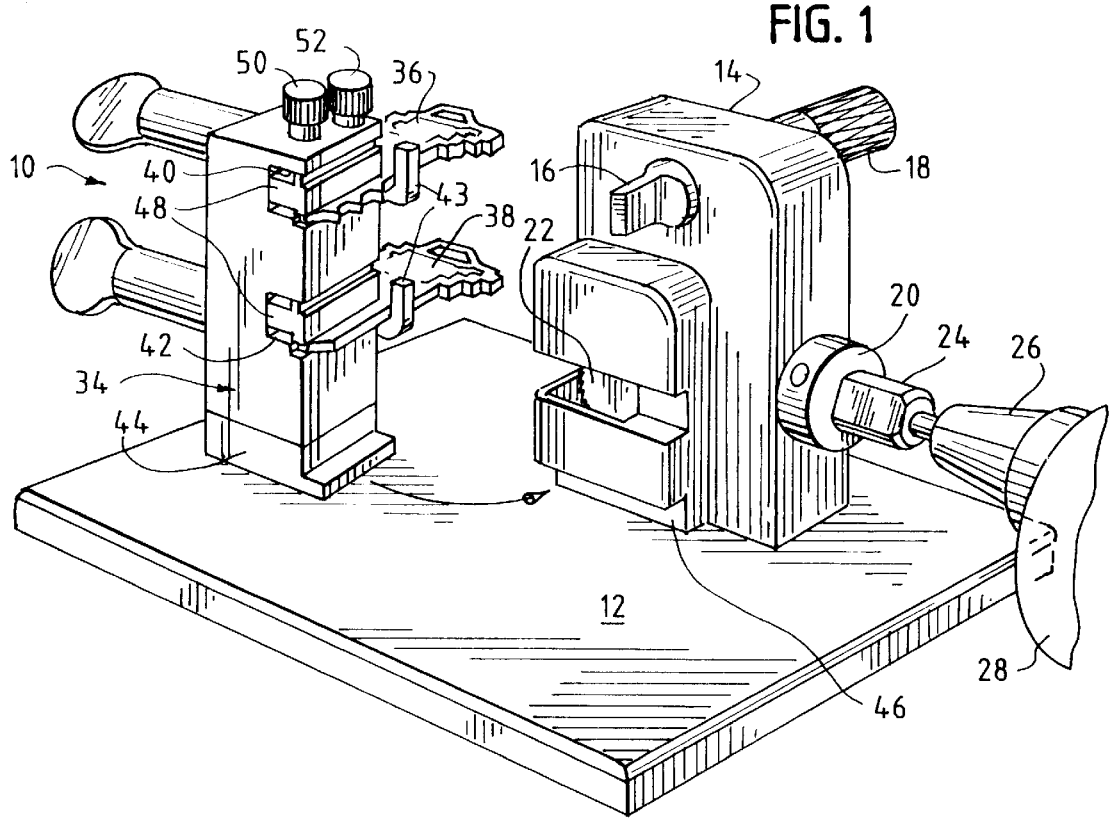
FIG. 1 is a perspective view showing the key carriage and the cutter housing assembly in spaced relationship with a portable power tool receiving the cutter shaft.

Referring to FIG. 1 there is illustrated the portable key cutting mechanism assembly 10 consisting of a base platform 12 to which is secured the cutter housing assembly 14. The cutter housing assembly 14 has located in its upper portion the tracer point 16 that is movable horizontally relative to the cutter housing 14 by the knurled adjusting knob 18. Located in the lower portion of the cutter housing 14 is the cutter shaft 20 to which at one end is connected the cutter 22 and at its other end 24 is shown connected to the chuck 26 of a portable electric drill 28 containing the electric motor to drive the cutter shaft 20. As shown in FIG. 5 the tracer point 16 is retained in position relative to the housing 14 by set screws 30 that fit into a slot 32 formed in the side of the tracer point 16 so that upon rotation of the adjusting knob 18 the tracer point 16 will not rotate but will move in and out relative to the cutter housing 14.

We now turn to the carriage assembly 34 in which is clamped the key 36 and the key blank 38 that is to be cut into a duplicate of the key 36. The carriage is separate from and free to slidably move on the base platform 12. As is well known in the key making art the key 36 and key blank 38 are guided to their proper positions by key gauges 43 and clamped in recesses 40 and 42 respectively. The key gauges 43 are affixed to the carriage assembly by screws 45. The recesses 40, 42 are in vertical alignment and are positioned so when the carrage is brought into contact with the cutter housing assembly the key and key blank clamped in said recesses will be in engagement lined up with the tracer point 16 and the cutter 22. During operation the carriage that is separate from the cutter housing assembly is slidably moved relative to the cutter housing assembly while keeping the tracer point 16 in contact with the key 36 to duplicate the key configuration in the key blank 38. To facilitate the accurate movement of the carriage relative to the cutter housing assembly the jaw base 44 of the carriage slides within the recess 46 located at the base of the cutter housing assembly.

Figure 2:
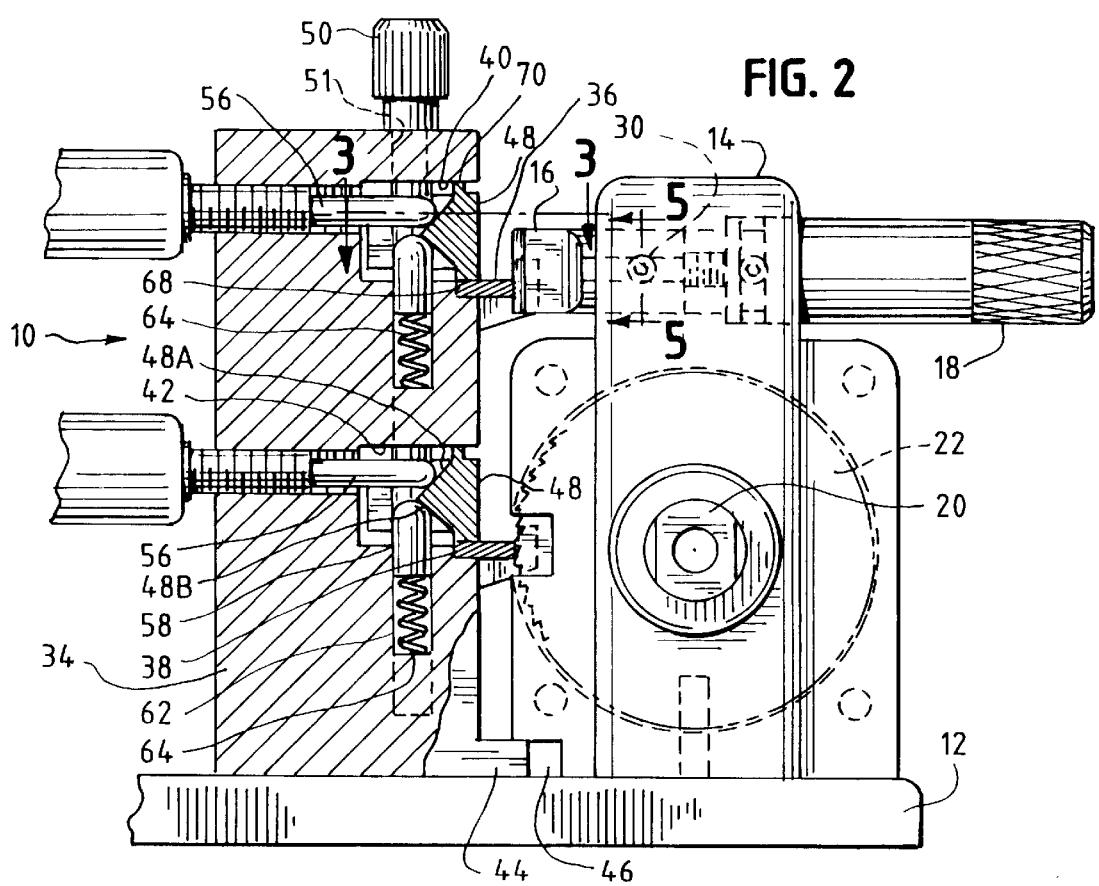
FIG. 2 is a partial cross sectional view showing the carriage in engagement with the cutter housing assembly to affect the key duplication.

In FIG. 2 there is illustrated the novel clamping assemblies for securing the key and key blank in position in their respective recesses 40 and 42 in the freely movable carriage assembly. Each clamping assembly includes a vice jaw 48 that is wedged into position to lock its respective key or key blank relative to the carriage and thus are accurately positioned when the key and key blank are moved into contact with the tracer point and cutter.

The vice jaws 48 are fixed in position in their recesses 40, 42 of the carriage assembly 34 by the jaw shafts 50, 52 that extend downwardly through aligned openings 51, 53 in the carriage assembly and vice jaws 48 respectively. The openings 53 in the vice jaws are several thousandths larger then the diameter of the jaw shafts to permit the clamping movement of the vice jaws. To facilitate the clamping movement the vice jaws define on their back side in the central portion thereof wedge shaped surfaces 48A, 48B. The upwardly sloped surface 48A is positioned to be engaged by threaded studs 56 so that when the studs 56 are moved inwardly they bias the vice jaws downwardly to clamp the key and key blank in position. This movement of the vice jaws is permitted by the aforementioned slight difference between the diameter of the jaw shafts 50, 52 and the openings 53 in the vice jaws. When the studs 56 are retracted the jaws 48 are free to move and pins 58 located in openings 62 of the carriage assembly are biased upwardly by springs 64 which act against the lower wedge surfaces 48B to bias the jaws 48 out of engagement with the key and key blank. In the illustrated embodiment the key and key blank are located in recesses 68 which has the illustrated depth to receive certain keys and key blanks If a shorter key depth is desired the vice jaws are inverted and the flanges 70 on the vice jaws are located in the recesses 68.

It is intended to cover by the appended claims all such modifications which fall within the true spirit and scope of the invention.

What is claimed:

1. A portable key cutting machine comprising a support, a cutter housing assembly secured to said support including a cutter and a drive shaft for said cutter, which drive shaft is constructed and arranged for receiving a portable motor for operating said cutter drive shaft, and an adjustable tracer point, a key carriage separate from and movable on said support, said key carriage having spaced clamping assemblies adapted to support in spaced relationship a key and a key blank to be cut into a duplicate of said key with said key being positioned to be engaged by said tracer point and said key blank to be simultaneously engaged by said cutter whereby the key blank will be made into a duplicate of said key when the carriage is moved on said support so the tracer point follows the key pattern to cut the blank into the identical pattern as said key.

2. A key cutting machine as set forth in claim 1 in which the separate and freely movable key carriage includes clamping assemblies that are vertically spaced and they include vice jaws that define wedge shaped rear surfaces that are engaged by pressure members to clamp the key and key blank into fixed position relative to said carriage.

3. A key cutting machine as set forth in claim 2 in which the clamping assemblies includes resiliently biased pin means for releasing said vice jaws when the pressure members are released.

4. A key cutting machine in accordance with claim 2 in which the clamping assemblies include shaft means extending through aligned openings defined by said carriage and said vice jaws to retain the jaws in position relative to said carriage.

5. A key cutting machine in accordance with claim 2 in which the carriage defines recesses for receiving the key and key blank during clamping.

6. A key cutting machine as set forth in claim 5 in which the vice jaws define a flange on one side thereof for fitting into said recesses for accommodating different key blanks.

7. A key cutting machine as set forth in claim 2 in which the carriage includes a key gauge disposed adjacent each clamping assembly for insuring proper position of said key and blank relative to said tracer point and cutter.

8. A key cutting machine as set forth in claim 1 of which the adjustable tracer point is located in the upper portion of said cutter housing assembly and is horizontally adjustable by an adjusting knob.

9. A key cutting machine in accordance with claim 8 in which the tracer point defines an axially extending slot and is prevented from turning by set screw means extending through said housing into said slot.

* * * * *